United States Patent [19]
Beazley et al.

[11] Patent Number: 5,935,487
[45] Date of Patent: Aug. 10, 1999

[54] CORROSION INHIBITED CALCIUM CHLORIDE SOLIDS AND BRINE SOLUTIONS

[75] Inventors: John Scott Beazley, Calgary; William Edward Sadar, Abbotsford; Douglas Robert Maynes, Okotoks, all of Canada; Mark G. Jantzen, Randolph, N.J.

[73] Assignee: General Chemical Corporation, Parsippany, N.J.

[21] Appl. No.: 09/128,811

[22] Filed: Aug. 4, 1998

Related U.S. Application Data

[62] Division of application No. 08/702,754, Aug. 22, 1996, Pat. No. 5,840,207.

[51] Int. Cl.⁶ ....................................................... C09K 3/18
[52] U.S. Cl. ........................... 252/70; 106/13; 106/14.44; 252/390; 252/392
[58] Field of Search ............................. 252/70, 390, 392; 106/13, 14.44

[56] References Cited

U.S. PATENT DOCUMENTS

| | | | |
|---|---|---|---|
| 3,575,883 | 4/1971 | Foley | 516/61 |
| 5,292,455 | 3/1994 | Zefferi et al. | 252/389.23 |
| 5,296,167 | 3/1994 | Murray | 252/389.2 |

OTHER PUBLICATIONS

Handbook of Text Methods for Evaluating Chemical Deicers, 1992; Cover page and pp. 189, 195, 272 and 273. no month.
Melt Down 20 Envirotech Services, Inc. Brochure, 4PP, 1995. no month.
Salt Additives and Alternatives Corrosion Study–1990–1 Minnesota Department of Transportation 4PP, no month.
Specifications for Liquid Calcium Chloride and Magnesium Chloride Pennsylvania Department of Transportation, Apr. 1998 4PP.
Tecyhnical Bulletin Page, Cargill Solarchem Resources (date not available) 1 page.
WITCO Modified Alkanolamide product and Safety Data Sheet of Mar. 1, 1995.
EPA Toxic Substances Control Act Chemical Substances Inventory (1985) p. 517, no month.

*Primary Examiner*—Anthony Green
*Attorney, Agent, or Firm*—Arthur J. Plantamura

[57] ABSTRACT

The addition of an effective amount of a liquid modified diethanolamide to a calcium chloride composition, which can be a brine solution or a solid, reduces the amount of corrosion of metals by the resulting composition. The calcium chloride/diethanolamide composition can be used as a deicer composition.

8 Claims, No Drawings

CORROSION INHIBITED CALCIUM CHLORIDE SOLIDS AND BRINE SOLUTIONS

This is a divisional of application Ser. No. 08/702,754, filed Aug. 22, 1996 now U.S. Pat. No. 5,840,207.

This invention relates to a partial replacement or alternative composition for sodium chloride and/or magnesium chloride used for deicing. More particularly, this invention relates to the use of calcium chloride containing a corrosion inhibitor as a deicer composition.

BACKGROUND OF THE INVENTION

Sodium chloride and magnesium chloride solutions have been used for deicing of road and roadway structures for many years. Sodium chloride is readily available and is inexpensive. however, the use of sodium chloride has several disadvantages; it has an adverse effect on roadside vegetation and the groundwater, and it severely corrodes roadside barriers, bridges and the like, as well as the vehicles that drive over them, adding to the overall costs of using sodium chloride. Thus a search has been ongoing for some time to replace sodium chloride as a deicer with a less corrosive material.

Other salts have been suggested, but either they are too expensive, unavailable in quantity, or they are also corrosive.

Calcium chloride is less corrosive than sodium chloride, but is still corrosive to metals. The use of calcium chloride as a deicer composition is advantageous because it generates heat when it hits solidified water such as snow or ice, further promoting deicing. Various corrosion inhibitors have been tried. The use of chromates as corrosion inhibitors for calcium chloride brine solutions is known; however, the use of chromates is being discouraged because they harm the environment. The use of nitrites has also been suggested, but a high level of the nitrite in calcium chloride is required as a corrosion inhibitor.

Zefferi et al in U.S. Pat. No. 5,292,455 have disclosed the addition of 2-hydroxyphosphorus acetic acid to calcium chloride brines as a corrosion inhibitor, effective in amounts of 240–1000 ppm of the additive in the brine solution, but this additive is expensive.

U.S. Pat. No. 5,296,167 to Murray suggests the substitution of calcium chloride solutions for sodium chloride as a deicer. Since calcium chloride is also corrosive, this reference discloses the addition of orthophosphates as corrosion inhibitors. However, large amounts of the inhibitors are required, up to 40 grams/gallon of brine. This solution must also contain pH buffers such as calcium carbonate and magnesium hydroxide, all of which add to the cost of these solutions. Further, these additives can find their way into sewers and public waterways.

Thus an inexpensive, effective deicer composition that is less corrosive than sodium chloride would be of interest.

SUMMARY OF THE INVENTION

We have found that calcium chloride can be admixed with an additive that inhibits the corrosion of metals and roadway structures. This deicer composition provides an excellent alternate and/or complement to sodium chloride or magnesium chloride as a deicer composition. The additive for calcium chloride in accordance with the invention is a modified diethanolamide which, when combined with calcium chloride, results in a homogeneous deicer that is stable at very low temperatures.

DETAILED DESCRIPTION OF THE INVENTION

Calcium chloride is commercially available in the form of brine solutions at various calcium chloride concentrations, and is also available as a solid flake. The solutions can be shipped as an 18–45% by weight solution of the calcium chloride. Untreated, these solutions are corrosive to metals such as bridge structures, concrete barriers, metal signs and lighting, as well as vehicles and application equipment, although less so than sodium chloride. However, we have found an additive that is inexpensive, and when properly mixed, is non-foaming and is completely soluble in liquid calcium chloride in the amounts required to obtain the desired results.

When the calcium chloride is in the form of a solid material, such as flake, the additive can be sprayed onto the flake in the desired amounts, or first added to water and the solution applied to the solid.

The additive for use in the invention is a modified diethanolamide, suitably a reaction product of cocoamide and phthalic anhydride. One such commercially available additive contains about 9.5–10.5% by weight of water, and remains soluble in calcium chloride solutions at temperatures as low as −35° C. It is a non-hazardous material. The additive is a clear, amber liquid, has an acid number of 55–75 and a pH of about 8.5. When a modified diethanolamide is added even in quite small amounts of 100–2000 ppm to a calcium chloride brine, an 80–90 percent reduction in corrosion of metals can be achieved.

The corrosion rate for dilute salt solutions (3% by weight) for iron-based metals is 17–50 mils per year (hereinafter MPY). An acceptable standard in the marketplace for a corrosion resistant deicer solution is a reduction in corrosion of about 70% or more from that of sodium chloride, or a maximum corrosion of between 5.18–15.00 mils per year (MPY), again depending on the salt standard used.

Corrosion testing is done according to NACE Standard TM-01-69, or to tests SHRP-H332/205.7 and ASTM G31-72. In accordance with this test, metal samples, or coupons, are cleaned, dried and weighed, and are alternately dipped in brine solution (10 minutes) and pulled out of the brine solution and exposed to air (50 minutes) for 72 hours. The coupons (1.25"OD×0.25" ID×0.03125") are inspected and weighed to determine how much metal was lost or corroded. The coupons are made of mild steel.

Corrosion testing results are summarized in the following Tables using various concentration of brine solutions. The corrosion inhibitor used to generate the data is an ethanolamide made by reacting phthalic anhydride with cocoamide.

The Tables I to IV below give corrosion data for various calcium chloride solutions.

Referring to Table I, using water alone, the average corrosion of 13 samples tested was 4.61±2.08 MPY.

Tests of 8 samples of sodium chloride brines showed corrosion of 47.19±3.24 MPY. Subtracting the corrosion due to water alone, the average corrosivity of sodium chloride solution is 42.58 MPY.

Ten samples of a 30% by weight calcium chloride solution prepared from 77% flake had an average corrosion of 20.24±4.51. Again subtracting the corrosion due to wafer, the corrosivity of this calcium chloride solution was 15.63 MPY, which is only 36% of that of sodium chloride brine. Thus the calcium chloride solution is less corrosive than that of sodium chloride. The corrosion resistance is expressed below as % inhibition of corrosion. Substituting calcium chloride for sodium chloride results in a % inhibition for calcium chloride of 63.29%.

Table I summarized the & inhibition of corrosion obtained with increasing amounts of the inhibitor of the invention.

TABLE I

| INHIBITOR Conc, ppm | INHIBITION, percent |
|---|---|
| — | 63.29 |
| 400 | 85.48 |
| 1000 | 85.49 |
| 2000 | 88.65 |
| 5000 | 89.81 |

It is apparent that even low levels of the inhibitor added to calcium chloride solution is very effective in reducing corrosion.

Table II summarizes data obtained as above using a 35% by weight calcium chloride production solution, compared to sodium chloride solution which had a corrosivity of 39.57 MPY.

TABLE II

| INHIBITOR Conc, ppm | INHIBITION, percent |
|---|---|
| — | 58.05 |
| 1000 | 74.65 |
| 2000 | 80.18 |
| 4000 | 85.72 |

Table III summarizes data obtained in the same manner using a 25% by weight solution of calcium chloride brine solution. The % inhibition is based on a test sodium chloride solution having a corrosivity of 39.38 MPY.

TABLE III

| INHIBITOR Conc, ppm | INHIBITION, percent |
|---|---|
| — | 62.12 |
| 1000 | 81.50 |
| 2000 | 85.66 |
| 5000 | 89.81 |

Table IV summarizes data obtained in the same manner using a 32% by weight calcium chloride solution, an industrial product, The percent inhibition is based on test sodium chloride solutions having a corrosivity of 38.49 MPY.

TABLE IV

| INHIBITOR Conc, ppm | INHIBITION, percent |
|---|---|
| — | 46.28 |
| 1500 | 78.07 |
| 2000 | 78.37 |
| 5000 | 82.88 |

It is apparent that a large reduction in the corrosion of metals is obtained using the calcium chloride compositions including an inhibitor in accordance with the present invention.

Since calcium chloride solutions are also used as accelerator additives for cement, which is generally reinforced with steel bars, the present inhibition of calcium chloride may also be advantageous for use as a concrete accelerator. When calcium chloride brines are used to prepare drilling muds, the presence of the present additive reduces the corrosion of metal piping, drill bits and the like as well. The present inhibited solutions can also be used in low-corrosion refrigeration brines.

Although the present invention has been described in terms of specific embodiments, various changes can be made, including varying the concentration of the additive, varying the specific alkanolamide additive, and the composition of the flake or brine with which the additive will be used. Thus the invention is only meant to be limited by the scope of the claims appended hereto.

We claim:

1. A composition that inhibits the corrosion of metals in roads and roadway structures comprising a calcium chloride deicer composition containing at least about 100 part per million of a modified diethanolamide inhibitor in liquid form.

2. A composition according to claim 1 wherein said calcium chloride composition is an aqueous solution containing about 18–45 percent by weight of calcium chloride.

3. A composition according to claim 1 wherein said calcium chloride composition is a solid containing about 75–95 percent by weight of calcium chloride.

4. A composition according to claim 2 wherein the solution contains a sufficient amount of the inhibitor to reduce corrosion of iron-based metals by 70 percent compared to NACE standard TM-01-69.

5. A composition according to claim 1 wherein the modified diethanolamide is a reaction product of phthalic anhydride and cocoamide.

6. A composition according to claim 1 wherein from 100 up to 2000 parts per million of the inhibitor are contained in the composition.

7. A composition according to claim 1 for use as a roadway deicer and additionally containing sodium chloride.

8. A composition according to claim 1 for use as a roadway deicer and additionally containing magnesium chloride.

* * * * *